United States Patent
Vendrow (10) Patent No.: US 12,418,502 B2
(45) Date of Patent: Sep. 16, 2025

(54) COMPUTER SUPPORTED ENVIRONMENT FOR AUTOMATICALLY PRIORITIZING ELECTRONIC MESSAGES BASED ON IMPORTANCE TO THE SENDER

(71) Applicant: RingCentral, Inc., Belmont, CA (US)

(72) Inventor: Vlad Vendrow, Reno, NV (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 18/214,756

(22) Filed: Jun. 27, 2023

(65) Prior Publication Data
US 2023/0344790 A1  Oct. 26, 2023

Related U.S. Application Data

(63) Continuation of application No. 16/724,282, filed on Dec. 21, 2019, now abandoned.

(51) Int. Cl.
| | |
|---|---|
| *H04L 51/226* | (2022.01) |
| *G06F 40/30* | (2020.01) |
| *G06N 20/00* | (2019.01) |
| *H04L 51/02* | (2022.01) |
| *H04L 51/234* | (2022.01) |

(52) U.S. Cl.
CPC ............ *H04L 51/226* (2022.05); *G06F 40/30* (2020.01); *G06N 20/00* (2019.01); *H04L 51/02* (2013.01); *H04L 51/234* (2022.05)

(58) Field of Classification Search
None
See application file for complete search history.

(56) References Cited

U.S. PATENT DOCUMENTS

| | | | | |
|---|---|---|---|---|
| 9,047,253 | B1* | 6/2015 | Gates | H04L 63/0861 |
| 2007/0081636 | A1* | 4/2007 | Shaffer | G06Q 10/107 |
| | | | | 379/80 |
| 2008/0104052 | A1* | 5/2008 | Ryan | G06F 16/35 |
| | | | | 707/999.005 |
| 2008/0126951 | A1* | 5/2008 | Sood | H04L 51/226 |
| | | | | 715/752 |
| 2010/0179961 | A1* | 7/2010 | Berry | G06Q 10/107 |
| | | | | 707/769 |
| 2015/0215254 | A1* | 7/2015 | Bennett | H04M 3/2281 |
| | | | | 709/206 |
| 2016/0142359 | A1* | 5/2016 | Lock | G06Q 10/107 |
| | | | | 709/206 |
| 2017/0004561 | A1* | 1/2017 | Rackley | G06N 20/00 |
| 2018/0004732 | A1* | 1/2018 | Brunn | G06F 3/0482 |

\* cited by examiner

*Primary Examiner* — Mohamed Ibrahim (57) ABSTRACT

A method includes analyzing a content of an electronic message associated with a sender. A score associated with the electronic message is generated. The score is indicative of an importance of the electronic message to the sender. The electronic message is automatically flagging based on the score. The flagged electronic message is transmitted to a recipient.

17 Claims, 6 Drawing Sheets

COMPUTER SUPPORTED ENVIRONMENT FOR AUTOMATICALLY PRIORITIZING ELECTRONIC MESSAGES BASED ON IMPORTANCE TO THE SENDER

RELATED APPLICATIONS

The instant application is a continuation application that claims the benefit and priority to the Non-Provisional U.S. patent application Ser. No. 16/724,282 that was filed on Dec. 21, 2019, which is incorporated herein by reference in its entirety.

TECHNICAL FIELD

The present disclosure relates generally to the field of computer-supported messaging systems. More specifically, and without limitation, this disclosure relates to systems and methods for automatically analyzing electronic messages and associating a priority based on the importance of the electronic message to the sender.

BACKGROUND

Use of electronic devices and messaging systems, e.g., electronic mail (email), short messaging systems (SMS), instant messenger, messaging through online collaborative teams, etc., has become prevalent and an essential aspect of daily routine for most people. With the increased use of electronic devices, there has been an upsurge in electronic message communication, which has become not only overwhelming but also time consuming. Accordingly, some effort has been made in prioritizing messages for the recipient of the electronic message in order to view the messages based on their importance. However, there is often a disconnect between what is deemed important to the recipient as opposed to the sender of the electronic message.

There has also been some effort made in identifying emails to the recipient that are deemed important to the sender. For example, the sender may manually flag the email with a high priority flag before sending it to notify the recipient that the email is important. Unfortunately, flagging email manually is not available to other electronic messaging platforms, e.g., SMS, instant messenger, etc. Moreover, it may often be the case that virtually every email sent by a sender is flagged with a high-importance flag, therefore losing its value. Furthermore, conventionally, when an email is set with a high-priority flag, the sender often has no remedy or recourse but to hope that the recipient would prioritize his/her email over others.

SUMMARY

The present disclosure arises from the realization that there may be a disconnect between what electronic message is deemed as important to the recipient as opposed to the sender. The present disclosure further arises from the realization that while some email systems provide a high-importance flag for the sender to manually toggle to indicate the importance of the email to the sender, this flagging mechanism is not available in other messaging platforms. Moreover, toggling the high-importance flag by the sender is manual and sometimes inaccurate because some senders may deem virtually every email they send as high-importance. Accordingly, it is desirable to have a system that automatically analyzes the electronic message, e.g., email, SMS, instant messaging, etc., and determine the importance of the electronic message to the sender.

In some embodiments, the electronic message being sent from the sender to the recipient is analyzed. A score is determined based on the identity of the recipient, the relationship between the sender and the recipient, the strength of the relationship between the sender and the recipient, the identified urgent terms within the electronic message, and the relationship between the electronic message and the priority of the electronic message to the sender. Additionally, there is a higher level of intelligence built in by leveraging machine learning and artificial intelligence in determining many of the factors that are used in determining the score. In some embodiments, the electronic message is tracked to determine whether the recipient has read the electronic message. In some embodiments, a reminder electronic message may automatically be sent to the recipient if an electronic message that has a score exceeding a certain threshold score remains unread for a predetermined period of time.

A method includes identifying a recipient of an electronic message. A relationship between a sender of the electronic message and the recipient of the electronic message is determined. A content of the electronic message is analyzed to identify urgent terms within the electronic message, via a text predictor trained using machine learning associated with the sender. A score associated with the electronic message is generated. The score is based on the identified recipient, the relationship between the sender and the recipient, and the identified urgent terms within the electronic message. It is appreciated that in some nonlimiting examples the system can determine the importance of the electronic message to the sender based on sender's information alone. For example, the system may evaluate the sender's deadlines, as acquired from the sender's native or third-party application/systems. Accordingly, the score may be based on deadlines featured in the sender's calendars, performance-based goal setting systems, task-tracking systems, personal to-do lists, or any other system that tracks deadlines that relate to the content of the electronic message. It is appreciated that the score is indicative of importance of the electronic message to the sender. In some embodiments, the score is associated with the electronic message. The electronic message is automatically flagged based on the score. It is appreciated that the flagged electronic message is transmitted to the recipient. In some embodiments, flagging may include various types of visualizations and/or animations. For example, the electronic message may be placed higher in a recipient's unread list, displayed with a different visual appearance in the recipient's graphical user interface, animated to attract the user's attention, and/or otherwise visually prioritized to the recipient on the sender's behalf.

In some embodiments, the electronic message is tracked to determine whether the electronic message is read by the recipient after transmission of the flagged electronic message. According to some embodiments, a follow up electronic message is automatically sent responsive to determining that the electronic message is unread by the recipient and after a predetermined amount of time has expired. It is appreciated that in some embodiments the tracking occurs responsive to the score exceeding a predetermined threshold.

It is appreciated that in some embodiments, the method may further include determining an importance of the relationship between the sender and the recipient via applying one of a machine learning supervised algorithm, a machine learning unsupervised algorithm, a machine learning semi-supervised algorithm, or a machine learning association rules. It is appreciated that the generation of the score is further based on the determined importance of the relationship between the sender and the recipient. According to some embodiments, the machine learning supervised algorithm is one of a classification, a regression, or a similarity learning algorithm. In some embodiments, the machine learning association rules is one of a learning classifier systems, or an inductive logic programming.

In some embodiments, the method may further include applying a decision tree machine learning model, a regression analysis machine learning model, or a Baysian network machine learning model to the identified urgent terms to determine a relationship between the electronic message and a priority of the electronic message to the sender. It is appreciated that the score is further generated based on the relationship between the electronic message and the priority of the electronic message to the sender.

In some embodiments, the method may further include determining a strength of the relationship between the sender and the recipient. According to some embodiments, determining the strength is based on at least one of a frequency of face-to-face interaction between the sender and the recipient, a frequency of electronic communication between the sender and the recipient, a quantity of electronic communication between the sender and the recipient, types of electronic communication between the sender and the recipient, duration of face-to-face interaction between the sender and the recipient, duration of electronic communication between the sender and the recipient, or presence or absence of other participants. The score is generated further based on the strength of the relationship between the sender and the recipient.

In some alternate embodiments, a recipient of an electronic message is identified. A relationship between a sender of the electronic message and the recipient of the electronic message is then determined. It is appreciated that a strength of the relationship between the sender and the recipient is determined. In some embodiments, the strength is based on at least one of a frequency of face-to-face interaction between the sender and the recipient, a frequency of electronic communication between the sender and the recipient, a quantity of electronic communication between the sender and the recipient, types of electronic communication between the sender and the recipient, duration of face-to-face interaction between the sender and the recipient, duration of electronic communication between the sender and the recipient, or presence or absence of other participants. In some embodiments, a content of the electronic message is analyzed to identify urgent terms within the electronic message, via a text predictor trained using machine learning associated with the sender. A decision tree machine learning model, a regression analysis machine learning model, or a Baysian network machine learning model is applied to the identified urgent terms to determine a relationship between the electronic message and a priority of the electronic message to the sender. As such, a score associated with the electronic message is generated. The score is based on the identified recipient, the relationship between the sender and the recipient, the strength of the relationship between the sender and the recipient, the identified urgent terms within the electronic message, and the relationship between the electronic message and the priority of the electronic message to the sender. In some embodiments, the score is associated with the electronic message. The electronic message is automatically flagged based on the score. It is appreciated that the flagged electronic message is transmitted to the recipient.

These and other features and aspects of the concepts described herein may be better understood with reference to the following drawings, description, and appended claims.

DETAILED DESCRIPTION

The example embodiments herein are directed to electronic messaging systems, such as online chat systems, conferencing systems, email systems, SMS, instant messaging systems, online collaborative team systems, social networking sites such as Facebook®, LinkedIn®, Twitter®, Instagram®, Snapchat®, etc. The present disclosure automatically identifies the importance and priority of an electronic message to the sender of the electronic message, as opposed to the recipient.

The importance of an electronic message is identified by analyzing the content of the message, e.g., body of the message, the subject line, the identity of the recipient(s), addressing of the recipient(s) such as whether the recipient is indicated in the "To" field as opposed to "cc" field as opposed to "Bcc" in some examples, etc. In some nonlimiting examples the content of the message may be cross-referenced with content from other applications, e.g., calendaring, task-tracking systems, personal to-do lists, etc., to determine the importance of the message. For example, if the message pertains to or contains the term "Product Release," the system can cross-reference the terms "Product Release" with the sender's calendar to determine that the Product Release date is in 2 days and should be highly prioritized. In other words, the system may evaluate the sender's deadlines, as acquired from the sender's native or third-party application/systems to determine the importance of the electronic message. Urgent terms, e.g., instructions, due date, verbs indicative of urgency, follow up, etc., within the electronic message are identified. The relationship between the electronic message and the priority of the electronic message to the sender is determined, e.g., by applying machine learning and artificial intelligence to the identified urgent terms based on text pattern recognition associated with the sender, etc. Moreover, a relationship between the sender and the recipient(s) is determined. In some embodiments, the strength of the relationship between the sender and the recipient(s) is also determined. A score, reflective of the importance of the electronic message to the sender, is generated based on the identified urgent terms, the relationship between the electronic message and the priority of the electronic message to the sender, the relationship between the sender and the recipient(s), the strength of the relationship between the sender and the recipient(s), etc. It is appreciated that a higher level of intelligence built-in by leveraging machine learning and artificial intelligence in determining many of the factors are used in generating the score.

In some embodiments, the electronic message is tracked to determine whether the recipient(s) reads the electronic message within a certain period of time. In some embodiments, a reminder electronic message may automatically be sent to the recipient(s) if the electronic message that has a score exceeding a certain threshold score remains unread for a predetermined period of time, e.g., 24 hours, 1 week, etc.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts and not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the art to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "analyzing," "transmitting," "facilitating," "providing," "forming," "detecting," "processing," "updating," "instantiating," "identifying," "contacting," "gathering," "accessing," "utilizing," "resolving," "applying," "displaying," "rendering," "authenticating," "aggregating," "associating," "requesting," "monitoring," "changing," "updating," "flagging," "tracking," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, a hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Figure 1:
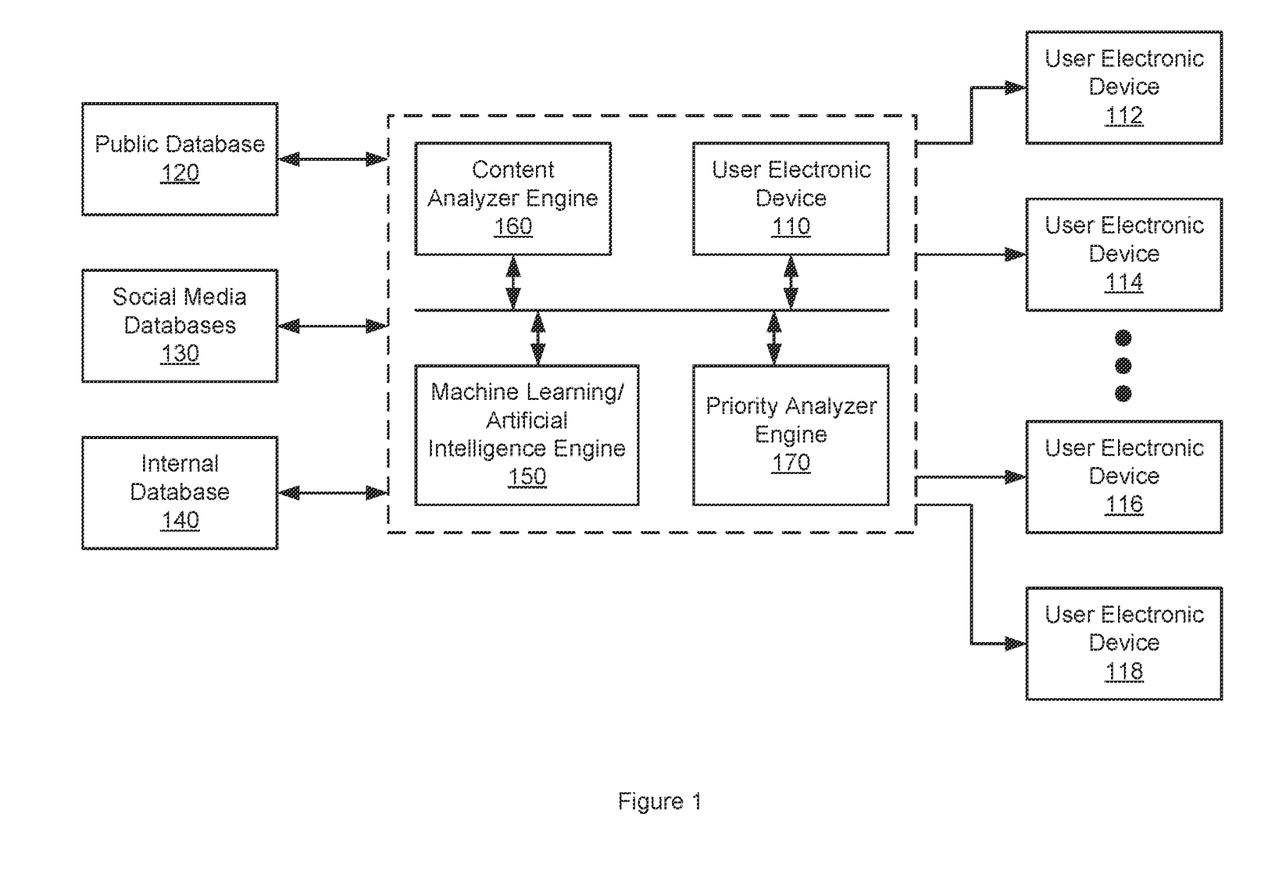
FIG. 1 depicts an example of an electronic system to automatically determine the importance and the priority of an electronic message to a sender, according to some embodiments.

Referring now to FIG. 1, an example of an electronic system to automatically determine the importance and the priority of an electronic message to a sender, according to some embodiments, is depicted. A sender of an electronic message may be associated with a user electronic device 110, e.g., a computer, a mobile device, tablet, etc. The user electronic device 110 is used by the sender to draft an electronic message, e.g., email, SMS, instant message, messaging through a collaborative team system, messaging through social media platform such as Facebook®, LinkedIn®, Twitter®, Instagram®, Snapchat®, etc., for one or more recipients. The recipients may be associated with the user electronic devices 112, 114, . . . , 116, and 118. It is appreciated that the number of sender(s) and recipient(s) shown is for illustrative purposes and not intended to limit the scope of the embodiments. The electronic message may be transmitted through any communication channel, e.g., wireless, fiber optics, cellular network, wired transmission lines, etc. It is appreciated that prior to sending the electronic message from the user electronic device 110 to one or more user electronic devices 112, 114, . . . , 116, 118 associated with one or more recipients, the importance of the electronic message to the sender is determined based on various factors (described below) and the priority of the electronic message is associated with the electronic message prior to sending the electronic message to one or more recipients.

Although the diagrams depict components as functionally separate, for determining the importance of the electronic message to the sender such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks. Each of the engines is a dedicated hardware block/component including one or more microprocessors and on-chip memory units storing software instructions programmed by a user for various operations, e.g., content analysis, sender/recipient relationship analyzer, priority analyzer, machine learning operations, etc. When the software instructions are executed by the microprocessors, each of the hardware components becomes a special purposed hardware component for practicing certain operations including machine learning functions as discussed in detail below. In some embodiments, the architecture is on a single chip, e.g., a system-on-chip (SOC).

Once the electronic message is drafted using the user electronic device 110, the one or more intended recipients of the electronic message are identified, e.g., using the content analyzer engine 160. For example, the electronic message such as an email may be analyzed to identify the destination address or contact associated with the electronic message. As a nonlimiting and illustrative example, when the electronic message is an email, the "To" field, the "CC" field, and the "BCC" field of the email may be analyzed to identify the recipients of the email.

According to some embodiments, once the recipients of the electronic message are identified, the relationship between the sender and one or more recipients is determined by querying one or more databases, e.g., public database 120, social media database 130, internal database 140, etc. In some embodiments, the public database 120 may be any database that is available to public, e.g., search engine, etc.

In contrast, social media databases 130 may include databases containing information regarding users such as Facebook®, LinkedIn®, Twitter®, Instagram®, Snapchat®, etc. Internal database 140 may include databases that are internal to an organization, e.g., human resource (HR) database that stores information regarding employees, call log database that stores call log with respect to one or more individuals, calendaring database that stores data with respect to an individual's calendar, internal email database where emails are stored on a server, etc. According to some examples, querying the public database 120 may reveal that the sender/recipient relationship includes both belonging to the same company, organization (e.g., professional organization, social club, etc.), etc. Querying the social media databases 130 may reveal that the sender/recipient relationship includes both belonging to Facebook® and LinkedIn® and being a contact of one another while the recipient follows the sender on Twitter®, the sender being a member of Instagram® but the recipient is not a connection of the sender on Instagram®, the recipient having a Snapchat® account but the sender not being a member of Snapchat®. According to some nonlimiting examples, querying the internal database 140, e.g., HR database, may reveal that the sender/recipient pair belongs to the same group within a company and that the recipient reports to the sender. In other nonlimiting examples, querying the internal database 140 reveals that the sender/recipient pair have a regular monthly meeting (e.g., by querying their calendaring database), and that the sender/recipient pair often converses on the telephone (e.g., by querying the call log database), etc. It is appreciated that it may be determined that the sender/recipient relationship may be employer/employee relationship, director/vice president relationship, vendor/organization relationship, customer/company relationship, colleagues within the same group relationship, social friendship relationship, immediate family relationship, etc. In some embodiments, the sender/recipient relationship may be determine by applying a machine learning association rules algorithm (i.e. discovering the sender/recipient relationship) implemented in the machine learning/artificial intelligence engine 150.

It is appreciated that in some embodiments, the machine learning/artificial intelligence engine 150 may apply machine learning algorithm to the identified relationship to determine the importance of the relationship between the sender and the recipient of the electronic message. For example, a higher importance may be placed when the sender is the recipient's boss instructing the recipient to take a specific action or to take care of a particular task whereas a lower importance may be placed when the sender is the recipient's colleague inquiring about lunch plans. In contrast, a higher importance may be placed when the sender is the CEO of the company whereas a lower importance may be placed when the sender and recipients are just acquaintances. It is appreciated that machine learning algorithms may include supervised algorithm (including classification, regression, and similarity learning) (i.e. classifying the importance or similarity of the relationship to the training model in order to rank/determine importance of the relationship), unsupervised algorithm (i.e. receive the input data such as the relationship to identify structure in the relationship and to learn from it), semi-supervised algorithm, machine learning association rules algorithm (i.e. discover importance of the sender/recipient relationship) (e.g., learning classifier algorithm to identify the context dependent rules and to apply knowledge in a piecewise manner to make a prediction, inductive logic programming, etc.), etc.

In some embodiments, the importance of the relationship between the sender and recipient may be partly based on the strength of the sender/recipient relationship. For example, sender/recipient pairs having frequent face-to-face meetings, telephone conversations, calendar meetings, etc. may have a stronger relationship as opposed to a sender/recipient pair that have a meeting once a year. It is appreciated that various factors may be considered in determining the strength of the relationship, e.g., frequency of face-to-face meeting interactions, frequency of electronic communications, quantity of electronic communications, types of electronic communications (e.g., telephone, email, text, instant messages, etc.), duration of face-to-face meetings, duration of electronic communications (e.g., duration of conference calls, etc.), presence or absence of other individuals during interactions, number and frequency of interactions with other individuals excluding the recipient (i.e. absence or limited interaction may reflect the importance of the sender/recipient relationship pair and presence of many interactions with other may reflect lower importance of the sender/recipient relationship), time of day interactions occur between the sender/recipient pair, geographical time zone and any differences thereof between the sender/recipient pair, presence or absence of recipient in the sender's contact list, number of common contacts between sender/recipient pair, percentage of common contacts for sender/recipient pair, etc. It is appreciated various machine learning algorithms may be applied to the identified relationship as well as additional information (e.g., frequency of meeting, duration of meeting, etc., as discussed above) in order to determine the strength of the relationship.

It is appreciated that the machine learning algorithms, as discussed above, are used and that models associated therewith are created. For example, a decision tree model may be used as a predictive model to predict the type of relationship, the strength of the relationship, etc. A support vector machines model may be used for supervised learning for classification and regression in determining the relationship and the strength thereof. In some examples, regression analysis may be used, such as linear or polynomial regression to estimate the sender/recipient relationship and their interactions, in order to identify the relationship and the strength thereof. In some nonlimiting examples, a Baysian network model is used to represent probabilistic sender/recipient relationship and the strength thereof.

According to some embodiments, the content analyzer engine 160 analyzes the content of the electronic message, e.g., content of the body, subject line (if any), the time that the message is sent, length of the electronic message, a number of action verbs, pairing of verb-noun, etc. The content analyzer engine 160 may identify urgent terms, e.g., "priority," "urgent," "time is of the essence," "due date," "schedule," "Attention," "immediate," "delegation," etc., within the electronic message. In some embodiments, the length of the electronic message may also be determined. As such, higher urgency terms used in a short messages may reflect higher importance/urgency as opposed to longer messages with a few urgent terms. In some embodiments, any machine learning algorithm (e.g., as described above) from the machine learning/artificial intelligence engine 150 may be applied to identify the urgent terms and further to determine a relationship between the electronic message and a priority of the electronic message to the sender. In one nonlimiting example, a text predictor trained using machine learning may be used. It is appreciated that the machine learning algorithm may be trained specifically for each sender (whether for identifying the urgent terms or the relationship and strength thereof as described above). As such, a sender that always uses many urgent terms may not generate a higher urgency determination or importance as opposed to a sender that sometimes uses urgent terms. In other words, the machine learning algorithm is specific to each sender and two different senders using the same language in a given electronic message may generate different urgency/importance based on their respective behavior, past electronic messages, their position, their relationship with the recipient, the strength of the relationship, etc.

It is appreciated that in some nonlimiting examples the system can determine the importance of the electronic message to the sender based on sender's information alone. For example, the system may evaluate the sender's deadlines, as acquired from the sender's native or third-party application/systems. Accordingly, the score may be based on deadlines featured in the sender's calendars, performance-based goal setting systems, task-tracking systems, personal to-do lists, or any other system that tracks deadlines that relate to the content of the electronic message.

It is appreciated that priority analyzer engine 170 may be used in some embodiments to generate a score associated with the electronic message. The generated score may be a reflection of the importance of the message to the sender of the electronic message to a particular recipient. It is appreciated that the score may be generated based on the identity of the recipient(s), relationship of the sender/recipient(s), strength of the sender/recipient(s) relationship, identified urgency terms resulting from analyzing the content of the message, length of the electronic message, relationship of the sender to other recipients included in the electronic message, absence of certain recipients on the electronic message, time the electronic message is sent, relationship between the electronic message and a priority of the electronic message to the sender, or any combination thereof. The score that is generated is associated with the electronic message by the priority analyzer engine 170. According to some embodiments, the electronic message may automatically be flagged based on the generated score. For example, a high importance flag may automatically be toggled to indicate that the electronic message is of high importance. In some embodiments, various flags may represent different levels of importance, e.g., not important at all, medium importance, high importance, very urgent, etc. In some embodiments, machine learning techniques may be used to automatically prioritize messages according to the importance of the electronic message to the sender. For instance, a machine learning classifier may be trained on the sender-related data, previously described herein, such that the trained machine learning classifier will automatically classify messages into different levels of priority based on the importance to the sender without the need to determine a score. For example, if a message is determined to be of "high priority" to the sender based on an imminent deadline determined from the contents of the sender's calendar, then the message will be classified as "high priority" and flagged or visually indicated as such for the recipient. In some embodiments, flagging may include various types of visualizations and/or animations. For example, the electronic message may be placed higher in a recipient's unread list, displayed with a different visual appearance in the recipient's graphical user interface, animated to attract the user's attention, and/or otherwise visually prioritized to the recipient on the sender's behalf. In some embodiments, a score may be associated instead of associating a flag. The score may be on any scale, e.g., 0-100 where 0 represents not important at all and 100 represents the highest importance, etc. It is appreciated that once the electronic message is appropriately associated with the determined level of importance, the electronic message may be sent to the recipient(s). It is appreciated that the process described above may occur for each sender/recipient pair. For example, the process as described above occurs for 5 sender/recipient pairs if there are 5 recipients on the electronic message. Moreover, it is appreciated that the level of importance indicated for the sender to each respective recipient may be different for the same electronic message being sent to multiple recipients depending on the relationship, the strength thereof, whether the recipient is being addressed or other recipients are being addressed in the electronic message, whether the recipient is in the "To" field as opposed to "CC" or "BCC", etc. In other words, the sender's message to one recipient on the same electronic message as another recipient may have a different level of priority and importance. Moreover, it is appreciated that the sender may send multiple messages to the same recipient and each sent message may have a different level of importance indicated for the sender based on the content of the electronic message, based on whether the recipient is being addressed or other recipients are being addressed in the electronic message, whether the recipient is in the "To" field as opposed to "CC" or "BCC", etc. In other words, multiple electronic messages being sent by the same sender to the same recipient may have different levels of importance and priority. Moreover, it is appreciated that the electronic message and determining its priority and importance to the sender may occur within the sender's device or through various components, e.g., sent to a server where it is analyzed prior to it being finally transmitted to the recipient(s).

Figure 2:
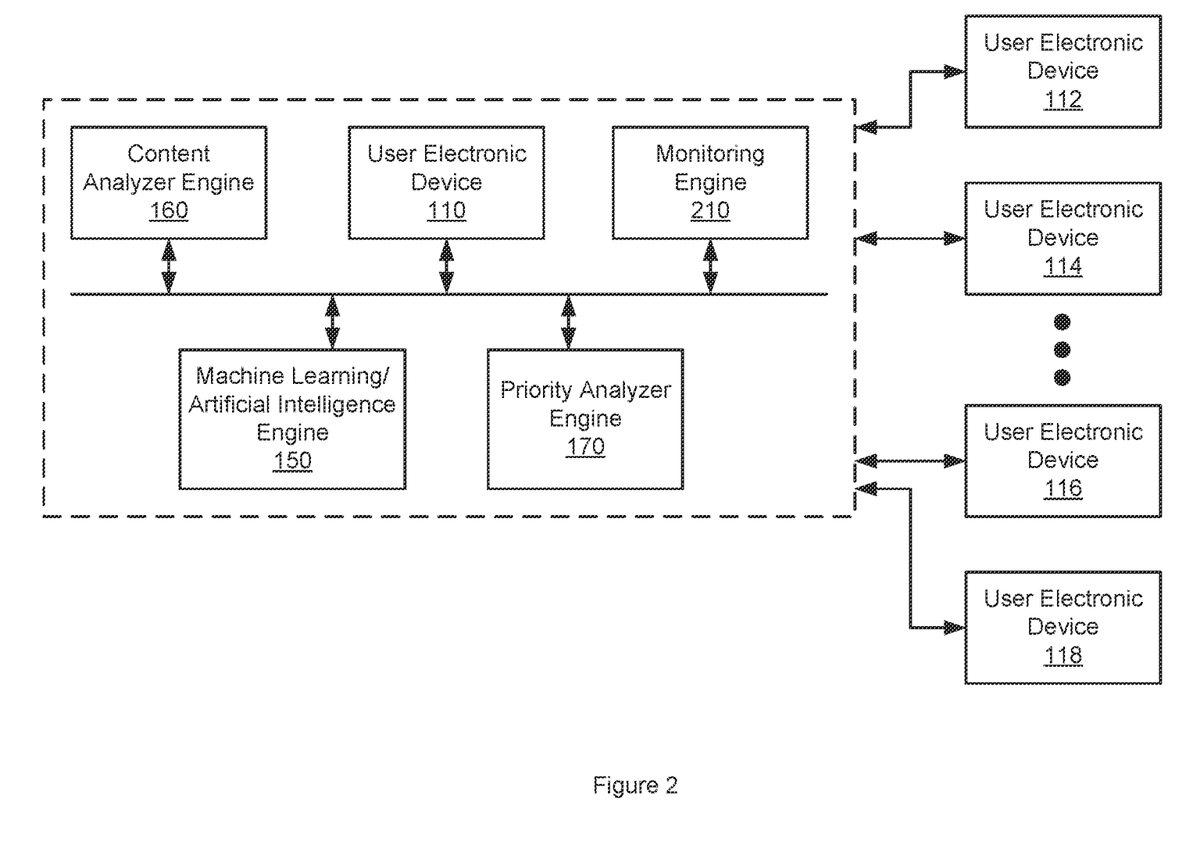
FIG. 2 depicts an example of an electronic system to automatically track important electronic messages from a sender and to automatically send a follow up message if an important electronic message remains unread by the recipient for a certain period of time, according to some embodiments.

Referring now to FIG. 2, an example of an electronic system to automatically track important electronic messages from a sender to a recipient and to automatically send a follow up message to the recipient if an important electronic message remains unread for a certain period of time, according to some embodiments is depicted. In some embodiments, the electronic message transmitted from the sender to one or more recipient(s) may be tracked, using a monitoring engine 210, based on the level of its importance to the sender. The monitoring engine 210 monitors to detect whether the recipient opens and reads the electronic message within a predetermined amount of time, e.g., 15 minutes, 1 hour, 24 hours, 1 week, etc. It is appreciated that the monitoring may occur for certain electronic messages that exceed a certain importance threshold level (that may be predetermined or user configurable). Moreover, it is appreciated that the same electronic message being sent to different recipients may have a different levels of importance to the sender, one may be tracked if it exceeds a certain importance threshold while the other may not be tracked if they do not exceed that threshold. Moreover, it is appreciated that if the electronic message remains unread/unopened after a certain period of time (that may be user configurable), an automatic reminder message may be sent to the recipient to remind him/her to open/read the electronic message. In some embodiments, the reminder message may indicate how important the message is to the sender in order to provide a visual indication to the recipient. In some embodiments, the monitoring engine 210 monitors for a predetermined amount of time for a response. If no response is received from the recipient after a predetermined amount of time, regardless of whether the message was read or unread, then a reminder message may be sent to the recipient. In some embodiments, a reminder message may be sent to the sender to remind the sender that a response from the recipient is still needed.

Accordingly, the sender is provided with recourse and remedy to remind the recipient to open/read the electronic message that is deemed as important to the sender. It is appreciated that in some embodiment, the period of time may be configurable and may be different for electronic messages with different levels of importance. For example, an electronic message with high importance may have a period of time of 1 day whereas a less important electronic message may have a period of time that is longer than 1 day.

Figure 3:
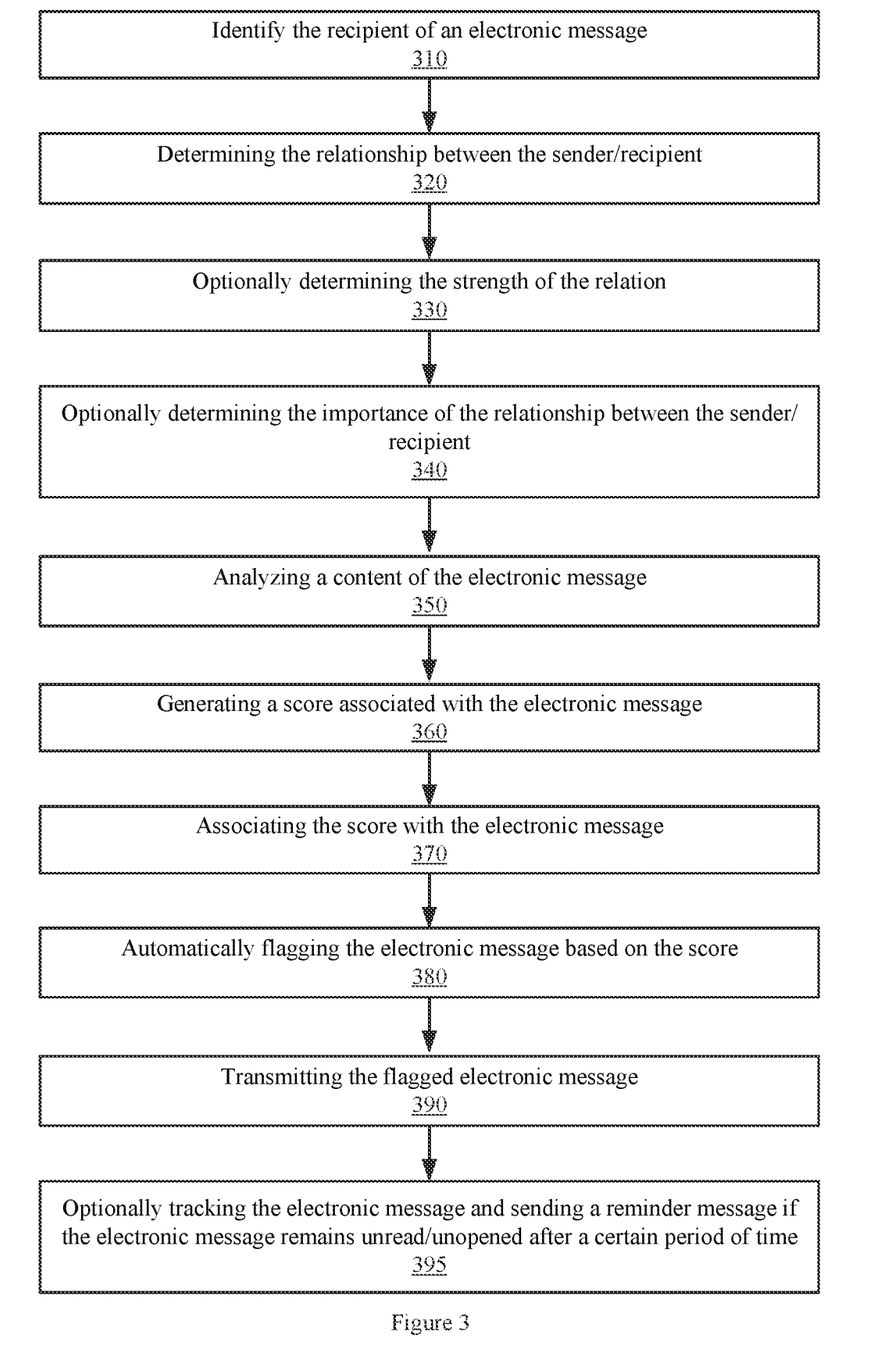
FIG. 3 is a flow chart illustrating an example method flow for automatically determining the importance and the priority of an electronic message to a sender and tracking the electronic message to appropriate action if important messages remain unread by the recipient, in accordance with some embodiments.

Referring now to FIG. 3, a flow chart illustrating an example method flow for automatically determining the importance and the priority of an electronic message to a sender and tracking the electronic message to appropriate action if important messages remain unread by the recipient, in accordance with some embodiments, is shown. At step 310, a recipient of an electronic message is determined, as described above with respect to FIG. 1. At step 320, the sender/recipient relationship is determined, as described with respect to FIG. 1. At step 330, the strength of the relationship is optionally determined, as described above. At step 340, the importance of the sender/recipient relationship is optionally determined, as described above. At step 350, the content of the electronic message is analyzed, according to the embodiments described above. At step 360, a score associated with the electronic message is generated, as described above. It is appreciated that the score may be generated based on various factors, as described above and reflects the level of importance of the electronic message to the sender sending the electronic message to particular recipient, as described above. At step 370, the determined score is associated with the electronic message and at step 380 the electronic message may be accordingly flagged to illustrate the level of importance of the message to the sender, as described in FIG. 1. At step 390, the electronic message with its associated score/flag is transmitted and sent to the recipient, as described. At step 395, the electronic message may optionally be tracked. For example, the electronic message having a score or being flagged with certain level of importance that exceeds an importance threshold, e.g., user configurable, default threshold, etc., may be tracked to determine whether the electronic message is read/opened by the recipient. In some embodiments, all electronic messages may be tracked. It is appreciated that in some illustrative embodiments, a reminder message may be sent to the recipient if the electronic message remains unread/unopened after a certain period of time has elapsed, e.g., 24 hours, 1 hour, 30 minutes, 1 week, etc. As such, the recipient may be reminded of importance of the electronic message to the sender.

Figure 4:
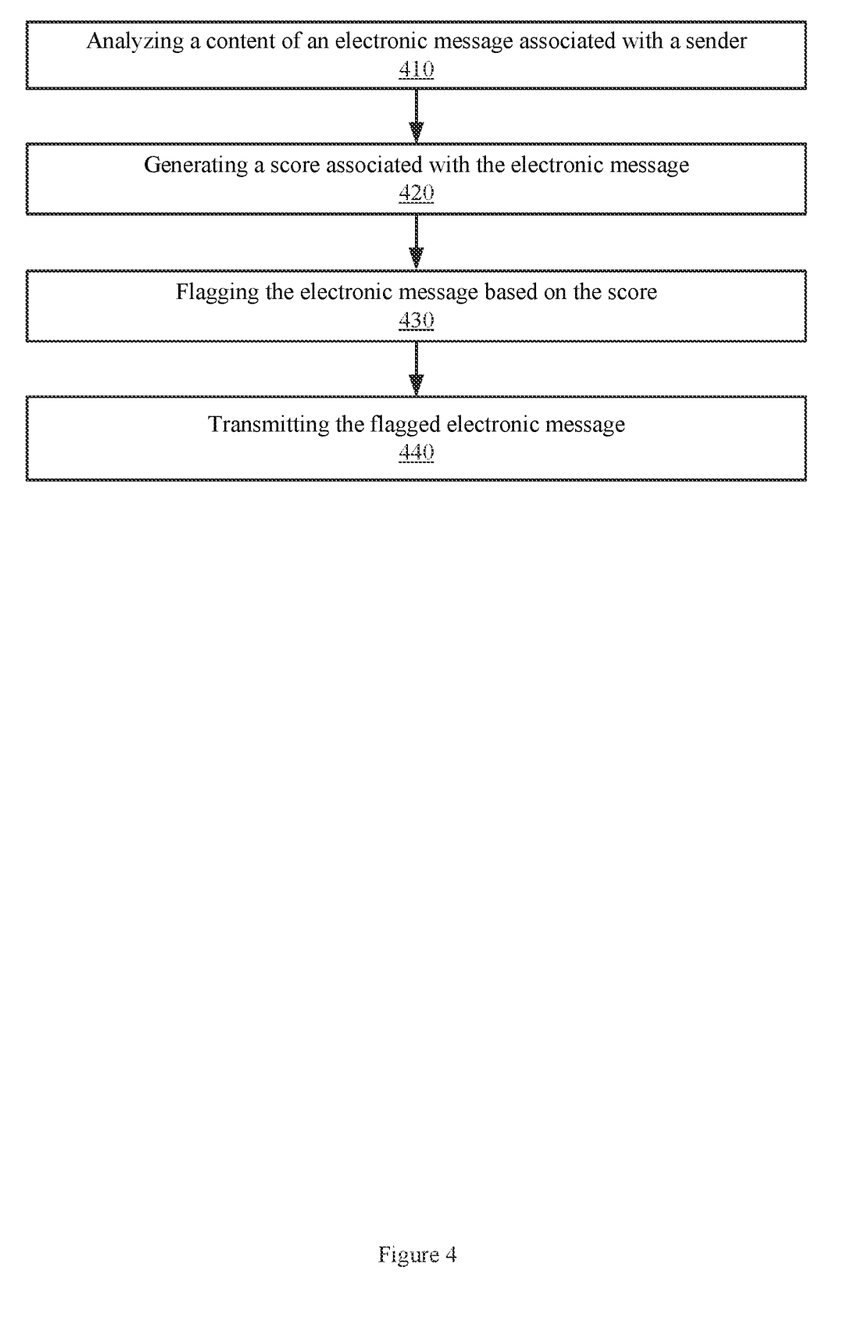
FIG. 4 is another flow illustrating an example method flow for automatically determining the importance and the priority of an electronic message to a sender, in accordance with some embodiments.

Referring now to FIG. 4, another flow illustrating an example method flow for automatically determining the importance and the priority of an electronic message to a sender, in accordance with some embodiments, is shown. At step 410, a content of an electronic message associated with the sender is analyzed, as described above. At step 420, a score associated with the electronic message is generated, as described above. The score is indicative of an importance of the electronic message to the sender. The electronic message is automatically flagged based on the score, at step 430. The flagged electronic message is transmitted to the recipient, at step 440.

Figure 5:
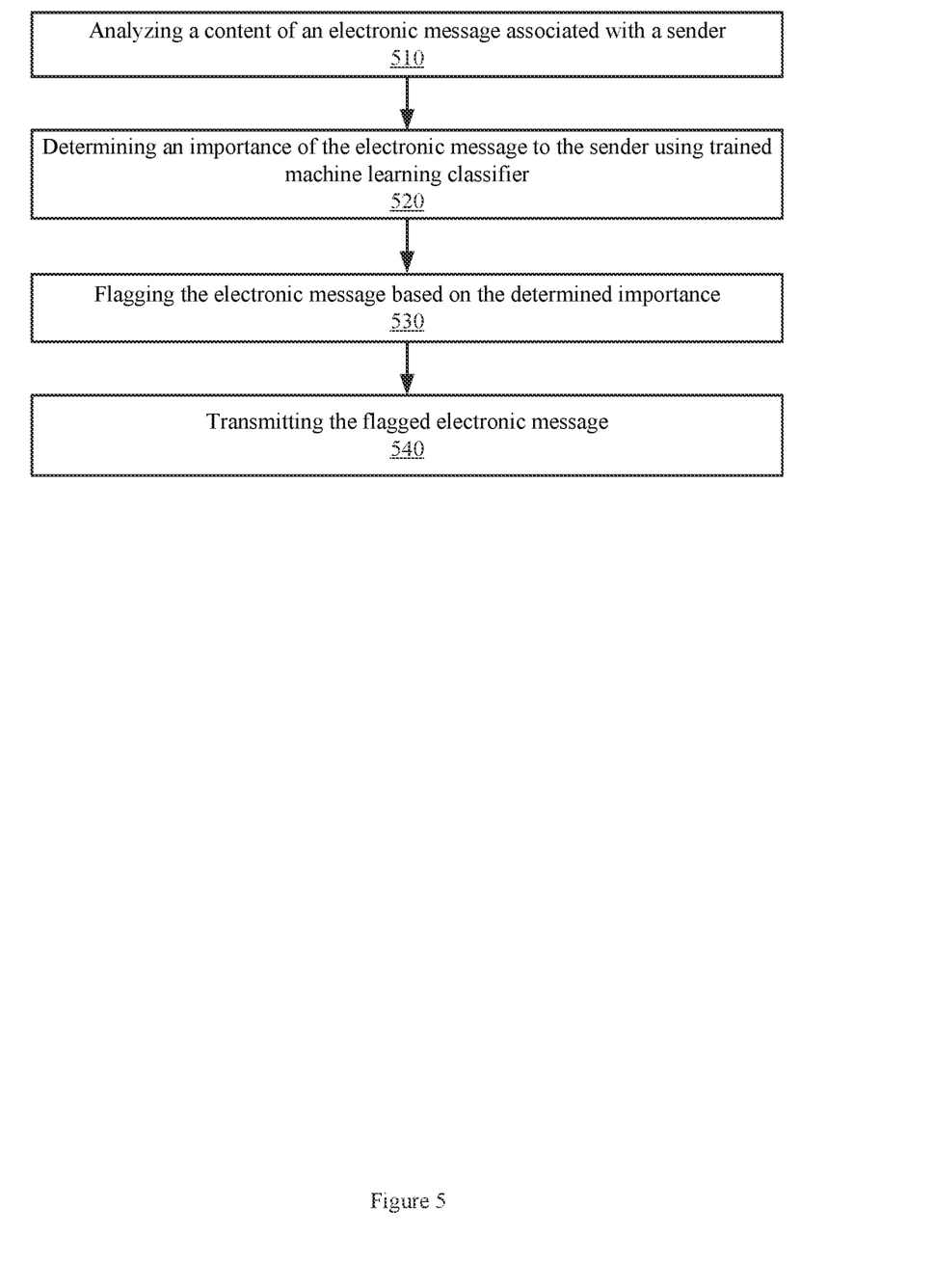
FIG. 5 is yet another flow diagram illustrating an example method flow for automatically determining the importance of an electronic message to a sender, in accordance with some embodiments.

Referring now to FIG. 5, yet another flow diagram illustrating an example method flow for automatically determining the importance of an electronic message to a sender, in accordance with some embodiments, is shown. At step 510, a content of an electronic message associated with a sender is analyzed, as described above. At step 520, an importance of the electronic message to the sender is determined using trained machine learning classifier, as described above. At step 530, the electronic message is flagged based on the determined importance of the electronic message to the sender. The flagged electronic message is transmitted to the recipient, at step 540.

Figure 6:
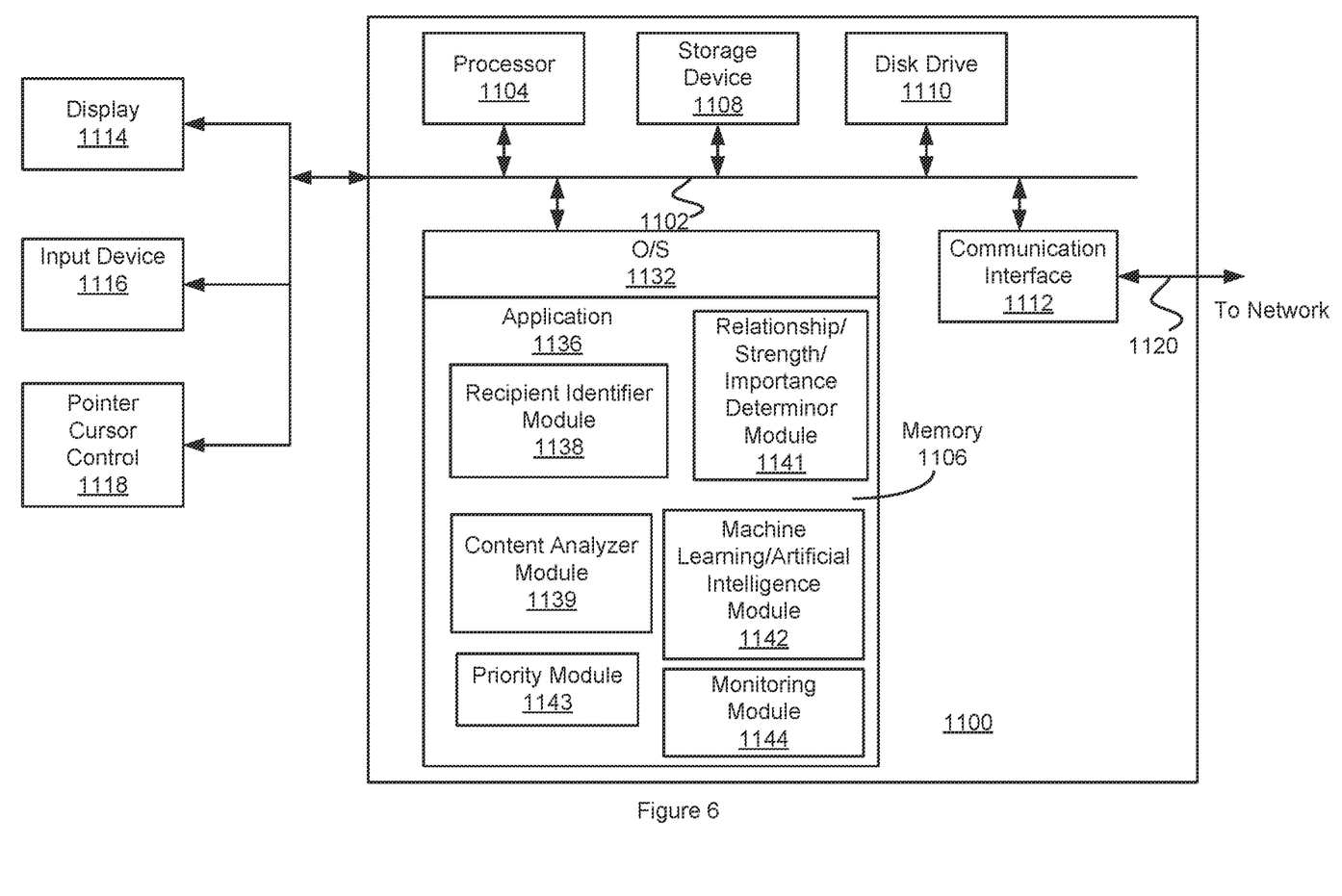
FIG. 6 is a block diagram depicting an example of a computer system suitable for automatically determining the importance and priority of an electronic message to a sender and tracking the message to take appropriate action if important messages remain unread by the recipient, in accordance with some embodiments.

Referring now to FIG. 6, a block diagram depicting an example of computer system suitable for automatically determining the importance and priority of an electronic message to a sender and tracking the message to take appropriate action if important messages remain unread by the recipient is shown. In some examples, computer system 1100 can be used to implement computer programs, applications, methods, processes, or other software to perform the above-described techniques and to realize the structures described herein. Computer system 1100 includes a bus 1102 or other communication mechanism for communicating information, which interconnects subsystems and devices, such as a processor 1104, a system memory ("memory") 1106, a storage device 1108 (e.g., ROM), a disk drive 1110 (e.g., magnetic or optical), a communication interface 1112 (e.g., modem or Ethernet card), a display 1114 (e.g., CRT or LCD), an input device 1116 (e.g., keyboard), and a pointer cursor control 1118 (e.g., mouse or trackball). In one embodiment, pointer cursor control 1118 invokes one or more commands that, at least in part, modify the rules stored, for example in memory 1106, to define the electronic message preview process.

According to some examples, computer system 1100 performs specific operations in which processor 1104 executes one or more sequences of one or more instructions stored in system memory 1106. Such instructions can be read into system memory 1106 from another computer readable medium, such as storage device 1108 or disk drive 1110. In some examples, hard-wired circuitry can be used in place of or in combination with software instructions for implementation. In the example shown, system memory 1106 includes modules of executable instructions for implementing an operation system ("O/S") 1132, an application 1136 (e.g., a host, server, web services-based, distributed (i.e., enterprise) application programming interface ("API"), program, procedure or others). Further, application 1136 includes recipient identifier module 1138 that identifies the recipient of an electronic message as described above in FIGS. 1-5. The application 1136 further includes relationship/strength/importance determinor 1141 that identifies the sender/recipient relationship, its strength and importance of the relationship. The application 1136 further includes content analyzer module 1139 to automatically analyze the content of the electronic message in order to determine the importance of the electronic message to the sender. The application 1136 further includes a priority module 1143 that determines the priority and importance of the electronic message to the sender, e.g., by generating a score, as described above. It is further appreciated that the application 1136 may further include machine learning/artificial intelligence module 1142 that assists in intelligently identifying the recipient, the relationship, the strength of the relationship, the importance of the relationship, analyzing the content, determining the priority and importance of the electronic message to the sender, etc., as described above. In some embodiments, the application 1136 further includes a monitoring module 1144 to monitor certain electronic messages and determine whether they remain unread/unopened and to send a reminder message if the electronic message remains unread/unopened after a certain period of time has passed. It is appreciated that the operation of the recipient identifier module 1138, content analyzer module 1139, relationship/strength/importance determinor module 1141, machine learning/artificial intelligence module 1142, priority module 1143, and monitoring module 1144 are described in detail with respect to FIGS. 1-5.

The term "computer readable medium" refers, at least in one embodiment, to any medium that participates in providing instructions to processor 1104 for execution. Such a medium can take many forms, including but not limited to, non-volatile media, volatile media, and transmission media. Non-volatile media includes, for example, optical or magnetic disks, such as disk drive 1110. Volatile media includes dynamic memory, such as system memory 1106. Transmission media includes coaxial cables, copper wire, and fiber optics, including wires that comprise bus 1102. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 1100. According to some examples, two or more computer systems 1100 coupled by communication link 1120 (e.g., LAN, PSTN, or wireless network) can perform the sequence of instructions in coordination with one another. Computer system 1100 can transmit and receive messages, data, and instructions, including program code (i.e., application code) through communication link 1120 and communication interface 1112. Received program code can be executed by processor 1104 as it is received, and/or stored in disk drive 1110, or other non-volatile storage for later execution. In one embodiment, system 1100 is implemented as a hand-held device. But in other embodiments, system 1100 can be implemented as a personal computer (i.e., a desktop computer) or any other computing device. In at least one embodiment, any of the above-described delivery systems can be implemented as a single system 1100 or can be implemented in a distributed architecture including multiple systems 1100.

In other examples, the systems, as described above, can be implemented from a personal computer, a computing device, a mobile device, a mobile telephone, a facsimile device, a personal digital assistant ("PDA") or other electronic device.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A computer-implemented method, comprising:
    prior to sending an electronic message to a recipient:
        analyzing a content of the electronic message associated with a sender;
        acquiring a task list of the sender;
        determining a correlation between the task list of the sender and the content of the message;
        based on the correlation between the task list of the sender and the content of the message, determining that the electronic message is important to the sender;
        determining a strength of a relationship between the sender and the recipient based on a company hierarchy;
        generating a score associated with the electronic message prior to the electronic message being sent to the recipient, wherein the score is generated based on the importance of the electronic message and the strength of the relationship between the sender and the recipient
        flagging the electronic message based on the score; and
    sending the electronic message and the generated score to the recipient.

2. The computer-implemented method as described in claim 1 further comprising tracking whether the electronic message is read by the recipient responsive to the score exceeding a predetermined threshold.

3. The computer-implemented method as described in claim 2 further comprising automatically sending a follow up electronic message responsive to determining that the electronic message is unread by the recipient and after a predetermined amount of time has expired.

4. The computer-implemented method as described in claim 1, wherein the strength of the relationship between the sender and the recipient is determined by querying a database.

5. The computer-implemented method as described in claim 4, wherein the database is a public database, social media database, or an internal database.

6. The computer-implemented method as described in claim 1, wherein the determining the strength of the relationship between the sender and the recipient is by applying a machine learning association rules algorithm to a database.

7. The method as described in claim 1, wherein the strength of the relationship between the sender and the recipient is determined based on at least two or more of a frequency of face-to-face interaction between the sender and the recipient, a frequency of electronic communication between the sender and the recipient, a quantity of electronic communication between the sender and the recipient, types of electronic communication between the sender and the recipient, duration of face-to-face interaction between the sender and the recipient, duration of electronic communication between the sender and the recipient, or presence or absence of other participants.

8. A system comprising:
    a processor;
    a memory operatively connected to the processor and storing instructions that, when executed by the processor, cause:
    prior to sending an electronic message to a recipient:
        analyzing a content of the electronic message associated with a sender;
        acquiring a task list of the sender;
        determining a correlation between the task list of the sender and the content of the message;
        based on the correlation between the task list of the sender and the content of the message, determining that the electronic message is important to the sender;
        determining a strength of a relationship between the sender and the recipient based on a company hierarchy;
        generating a score associated with the electronic message prior to the electronic message being sent to the recipient, wherein the score is generated based on the importance of the electronic message and the strength of the relationship between the sender and the recipient
        flagging the electronic message based on the score; and
        sending the electronic message and the generated score to the recipient.

9. The system as described in claim 8 wherein the memory stores further instructions that, when executed by the processor, cause tracking whether the electronic message is read by the recipient responsive to the score exceeding a predetermined threshold.

10. The system as described in claim 9 wherein the memory stores further instructions that, when executed by the processor, cause automatically sending a follow up electronic message responsive to determining that the electronic message is unread by the recipient and after a predetermined amount of time has expired.

11. The system as described in claim 8, wherein the strength of the relationship between the sender and the recipient is determined by querying a database.

12. The system as described in claim 11, wherein the database is a public database, social media database, or an internal database.

13. The system as described in claim 8, wherein the determining the strength of the relationship between the sender and the recipient is by applying a machine learning association rules algorithm to a database.

14. The system as described in claim 8, wherein the strength of the relationship between the sender and the recipient is determined based on at least two or more of a frequency of face-to-face interaction between the sender and the recipient, a frequency of electronic communication between the sender and the recipient, a quantity of electronic communication between the sender and the recipient, types of electronic communication between the sender and the recipient, duration of face-to-face interaction between the sender and the recipient, duration of electronic communication between the sender and the recipient, or presence or absence of other participants.

15. A non-transitory computer-readable medium storing a set of instructions that, when executed by a processor, cause:
prior to sending an electronic message to a recipient:
analyzing a content of the electronic message associated with a sender;
acquiring a task list of the sender;
determining a correlation between the task list of the sender and the content of the message;
based on the correlation between the task list of the sender and the content of the message, determining that the electronic message is important to the sender;
determining a strength of a relationship between the sender and the recipient based on a company hierarchy;
generating a score associated with the electronic message prior to the electronic message being sent to the recipient, wherein the score is generated based on importance of the electronic message and the strength of the relationship between the sender and the recipient
flagging the electronic message based on the score; and
sending the electronic message and the generated score to the recipient.

16. The non-transitory computer-readable medium as described in claim 15 that, when executed by a processor, cause tracking whether the electronic message is read by the recipient responsive to the score exceeding a predetermined threshold.

17. The non-transitory computer-readable medium as described in claim 16 that, when executed by a processor, cause automatically sending a follow up electronic message responsive to determining that the electronic message is unread by the recipient and after a predetermined amount of time has expired.

* * * * *